United States Patent
Rodriguez-Natal et al.

(10) Patent No.: US 12,294,569 B2
(45) Date of Patent: May 6, 2025

(54) LAYER-3 POLICY ENFORCEMENT FOR LAYER-7 DATA FLOWS

(71) Applicant: Cisco Technology, Inc., San Jose, CA (US)

(72) Inventors: Alberto Rodriguez-Natal, Leon (ES); Lorand Jakab, Gheorghieni (RO); Fabio R. Maino, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 449 days.

(21) Appl. No.: 17/718,634

(22) Filed: Apr. 12, 2022

(65) Prior Publication Data
US 2023/0328038 A1    Oct. 12, 2023

(51) Int. Cl.
*H04L 9/40* (2022.01)
*H04L 43/0823* (2022.01)
*H04L 43/0864* (2022.01)
*H04L 47/10* (2022.01)
*H04L 47/20* (2022.01)

(52) U.S. Cl.
CPC ...... *H04L 63/0407* (2013.01); *H04L 43/0847* (2013.01); *H04L 43/0864* (2013.01); *H04L 47/10* (2013.01); *H04L 47/20* (2013.01); *H04L 63/0281* (2013.01); *H04L 63/20* (2013.01)

(58) Field of Classification Search
CPC ............. H04L 63/0407; H04L 43/0847; H04L 43/0864; H04L 47/10; H04L 47/20; H04L 63/0281; H04L 63/20
See application file for complete search history.

(56) References Cited

U.S. PATENT DOCUMENTS

| | | | |
|---|---|---|---|
| 9,225,809 B1 | 12/2015 | Fausak | |
| 2007/0121615 A1* | 5/2007 | Weill | H04L 45/308 370/389 |
| 2007/0156919 A1 | 7/2007 | Potti et al. | |
| 2012/0039337 A1 | 2/2012 | Jackowski et al. | |
| 2016/0080502 A1* | 3/2016 | Yadav | H04L 43/04 709/227 |
| 2016/0094467 A1 | 3/2016 | Hong et al. | |
| 2021/0051044 A1 | 2/2021 | Wondra et al. | |
| 2021/0266262 A1 | 8/2021 | Subramanian et al. | |

(Continued)

OTHER PUBLICATIONS

European Search Report for corresponding EP Patent Application No. 23167036.5 dated Aug. 14, 2023, 10 pages.

*Primary Examiner* — Alex Skripnikov
(74) *Attorney, Agent, or Firm* — Lee & Hayes, P.C.

(57) ABSTRACT

Techniques for using proxies with overprovisioned IP addresses to demultiplex data flows, which may otherwise look the same at L7, into multiple subflows for L3 policy enforcement without having to modify an underlying L3 network. The techniques may include establishing a subflow through a network between a first proxy and a second proxy, the subflow associated with a specific policy. In some examples, the first proxy node may receive an encrypted packet that is to be sent through the network and determine, based at least in part on accessing an encrypted application layer of the packet, a specific application to which the packet is to be sent. The first proxy node may then alter an IP address included in the packet to cause the packet to be sent through the network via the subflow such that the packet is handled according to the specific policy.

20 Claims, 6 Drawing Sheets

(56) References Cited

U.S. PATENT DOCUMENTS

| | | |
|---|---|---|
| 2021/0273927 A1 | 9/2021 | Dhanabalan et al. |
| 2022/0255798 A1* | 8/2022 | Yavuz ................. H04L 41/5019 |
| 2023/0007314 A1* | 1/2023 | Wang ................... H04N 21/266 |

\* cited by examiner

LAYER-3 POLICY ENFORCEMENT FOR LAYER-7 DATA FLOWS

TECHNICAL FIELD

The present disclosure relates generally to techniques for, among other things, demultiplexing Layer 7 (L7) flows into multiple subflows for Layer 3 (L3) policy enforcement without having to modify an underlying L3 network.

BACKGROUND

Application traffic generally is in the form of encrypted layer-7 (L7) flows. In many cases, those encrypted L7 flows are composed of different L7 subflows that are served by different services or applications. Identifying distinctions between these subflows is typically possible at L7 when traffic is sent or received, but difficult at layer-3 (L3) due to the encryption in transit.

In the microservice world in particular, multiple microservices can be accessed at a same hostname and/or internet protocol (IP) address. In many cases, this is due to the fact that microservices are typically front-ended by an L7 load-balancer. As such, external traffic flowing towards these microservices might look the same at L3 and flow to the same IP:port, but at L7 they may actually be different paths. This poses a challenge for L3 network optimizations in general, but for software-defined wide area network (SD-WAN) optimizations in particular. For instance, if the traffic is flowing through an SD-WAN from on-premise to a cloud, or from one cloud to another cloud, all the connections may terminate at the same place.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
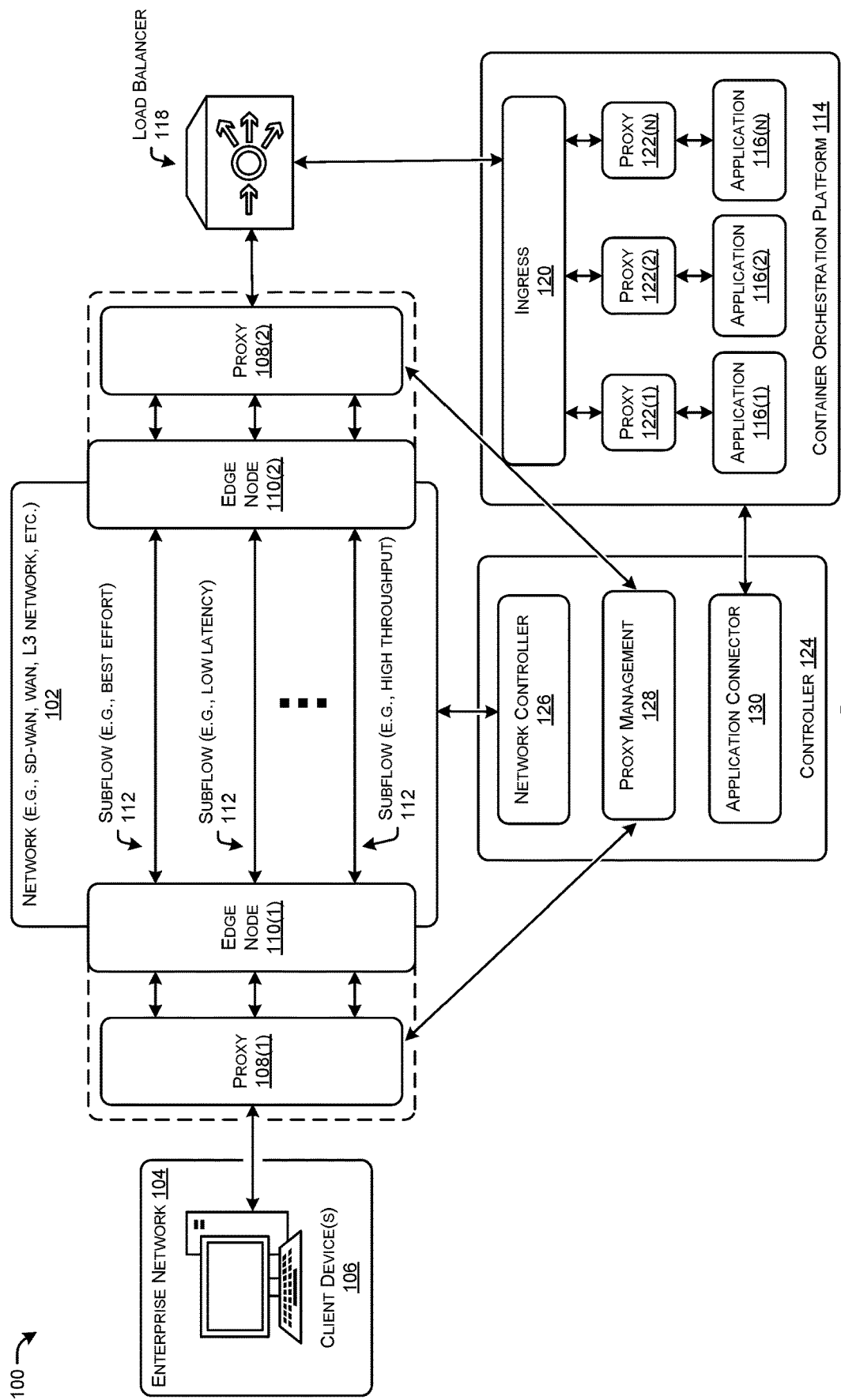
FIG. 1 illustrates an example architecture that may be used to implement various aspects of the technologies described herein.

This disclosure describes various technologies for demultiplexing data flows, which may otherwise look the same at L3, into multiple subflows for L3 policy enforcement without having to modify an underlying L3 network. By way of example, and not limitation, a method according to the technologies described herein may include establishing a subflow through a network between a first proxy node and a second proxy node (e.g., L7 proxy nodes), the subflow associated with a policy that is distinguishable from another policy associated with another subflow through the network. In some examples, the method may include receiving, at the first proxy node, a packet that is to be sent through the network. In some examples, the packet may include an encrypted portion (e.g., layers 5-7) including first data indicating that the packet is to be sent to an application and an unencrypted portion (e.g., layers 1-4 including at least a destination IP address field. In some examples, the destination IP address field may include a first IP address corresponding with a frontend node that is configured to forward traffic to the application and to other applications. In some examples, the method may include determining, by the first proxy node and based at least in part on the encrypted portion, that the packet is to be sent to the application. Based at least in part on determining that the packet is to be sent to the application, the method may include sending the packet through the network via the subflow such that the packet is handled according to the policy.

Additionally, the techniques described herein may be performed as a method and/or by a system having non-transitory computer-readable media storing computer-executable instructions that, when executed by one or more processors, performs the techniques described above.

Example Embodiments

As discussed above, encrypted L7 flows may be composed of different subflows that are served by different services or applications. Identifying distinctions between these subflows is typically possible at L7 when traffic is sent or received, but difficult at L3 due to the encryption in transit. In the microservice world in particular, multiple microservices can be accessed at a same hostname and/or IP address due to the fact that microservices are typically front-ended by an L7 load-balancer. As such, external traffic flowing towards these microservices might look the same at L3 and flow to the same IP/port combination, but at L7 they may actually be different paths. This poses a general challenge for L3 network optimizations and, in particular, for software-defined wide area network (SD-WAN) optimizations.

For example, it is typical for different microservices to have different policies for load balancing, A/B testing, etc. These policies are generally L7 policies and, in some examples, the different services and different flows that belong to each service may perform Hypertext Transfer Protocol (HTTP)-demultiplexing using proxies. That is, using an HTTP (or HTTPS) proxy to look at Uniform Resource Locator (URL) paths or HTTP headers on request. This allows for application of meaningful L7 policies with full information of the L7 subflows and their context. However, to be able to extend these policies to L3 or create new L3 policies for the different L7 subflows, a way to demultiplex the different L7 subflows at L3 would be necessary to allow for an L3-native way of identifying the L7 subflows. Today, different techniques for doing this exist, however, those techniques typically require modification of the underlying L3 network (e.g., SD-WAN) in order to recognize the L7 subflows.

This disclosure is directed to technologies for demultiplexing L7 subflows for L3 policy enforcement that do not require modification of the underlying L3 network (e.g., SD-WAN network). For instance, the technologies described herein include using proxies (e.g., HTTP proxies, HTTPS proxies, etc.) with overprovisioned IP addresses to effectively demultiplex L7 flows into multiple subflows, each of which may be unequivocally identifiable at L3. In this way, the disclosed techniques allow for, among other things, the application of microservice specific L3 policies (e.g., geofencing, quality of service, L3 optimizations, etc.) to traffic that goes to microservices behind a L7 load balancer and/or Kubernetes ingress.

For example, one or more proxies may be placed at the entry and exit points of an L3 network (e.g., SD-WAN) before and after the L3 network edges, respectively. In some examples, these proxies can either be co-located with the L3 network edge nodes or can be separate entities. In some examples, IP addresses may be overprovisioned in the proxies for use as L3 identifiers of HTTP URL paths and/or other HTTP headers. That is, for each L7 subflow type, one or more extra IP addresses may be assigned to the proxies at the L3 network edge. In some examples, because IP addresses may be more limited than the number of flows, flows that are to be treated similarly may be grouped into a set and assigned the same IP address.

In some examples, the proxies may be configured with one or more attributes for identifying a subflow. For instance, the proxies may be configured with a URL that points to a particular microservice, an HTTP/HTTPS header that identifies a subflow as destined to a given microservice, or the like. In some examples, the proxies may be configured with the IP address that has been assigned to identify the subflow (or set of subflows), as well as the IP addresses that each remote proxy may be using to identify the same subflow (or set of subflows).

In some examples, one or more of the extra IP addresses configured in the proxies may be assigned to each configured L7 subflow (or set of subflows). In this way, when the proxies have to send traffic for one of the subflows (or set of subflows), the proxy may use the configured IP address(es) rather than the regular IP address(es). For instance, the proxy may use its local IP address assigned to the subflow (or set of subflows) as the source IP address and the IP address configured on the remote proxy for the subflow (or set of subflows) as the destination IP address. In some examples, this arrangement may be flexible depending on implementation, and some implementations of the techniques may, for instance, simply use the destination IP address assigned to the subflow (or set of subflows) while leaving the source IP address to be non-subflow specific.

By utilizing the techniques described herein, data flows through L3 networks can be de-multiplexed so that the network can see different flows for each L7-sub flow. As such, the L3 network may no longer be looking at one flow that goes to a single place, but multiple, small flows that may go to different places. This allows for making per-flow optimizations at L3, such as low latency, best effort, high throughput, etc. That is, the techniques effectively enable the flows to be optimized as they go through the network at both L3 and L7, and still end up sending the right flow to the right back-end and/or front-end system.

Additionally, the techniques described herein make it possible to load balance at L3 in a similar fashion to the load balancing that happens at L7 for L7 subflows. For instance, first flows for a first application and second flows for a second application could be load balanced in the L3 network similarly to how they are load balanced on the application infrastructure. Additionally, the L3 load balancing would be transparent to the applications and/or end users, while also improving the application experience.

By way of example, and not limitation, a method according to the technologies disclosed herein may include establishing one or more subflows through a network between proxy nodes disposed at the entry and exit points of the network. In some examples, the network may be an L3 network, such as a Software-Defined Wide Area Network (SD-WAN) or any other type of network. In some examples, each subflow of the one or more subflows may be associated with a different application or service level. For instance, a first subflow through the network between a first proxy node and a second proxy node may be associated with a first application hosted on resources of a container orchestration platform, while a second subflow through the network between the first proxy node and the second proxy node may be associated with a second application hosted on the resources of the container orchestration platform, and so forth. In some examples, each of the different subflows may be configured to maintain, or otherwise be associated with, a specific level of service, such as an amount of throughput associated with the subflow, a packet loss frequency associated with the subflow, a bit error frequency associated with the subflow, an amount of latency associated with the subflow, or the like.

In some examples, the proxy nodes at the entry and exit points of the network may be located before and after the L3 network edges, respectively. In some examples, proxy nodes may either be co-located with the L3 network edge nodes or may be separate entities. In some examples, IP addresses may be overprovisioned on the proxy nodes for use as L3 identifiers of HTTP URL paths and/or other HTTP headers. That is, for each subflow type, one or more extra IP addresses may be assigned to the proxy nodes at the network edge. In some examples, because IP addresses may be more limited than the number of flows, flows that are to be treated similarly may be grouped into a set and assigned the same IP address.

In some examples, the proxy nodes may be configured with one or more attributes for identifying a subflow. For instance, the proxy nodes may be configured with a URL that points to a particular microservice application, an HTTP/HTTPS header that identifies a subflow as destined to a given microservice, or the like. In some examples, the proxy nodes may be configured with the IP address that has been assigned to identify the subflow (or set of subflows), as well as the IP addresses that each remote proxy node may be using to identify the same subflow (or set of subflows).

In some examples, one or more of the extra IP addresses configured in the proxy nodes may be assigned to each established subflow (or set of subflows). In this way, when the proxy nodes have to send traffic for one of the subflows (or set of subflows), the proxy may use the configured IP address(es) rather than the regular IP address(es). For instance, the proxy node may use its local IP address assigned to the subflow (or set of subflows) as the source IP address and the IP address configured on the remote proxy for the subflow (or set of subflows) as the destination IP address. In some examples, this arrangement may be flexible depending on implementation, and some implementations of the techniques may, for instance, simply use the destination IP address assigned to the subflow (or set of subflows) while leaving the source IP address to be non-subflow specific.

As such, in some examples, the method may also include receiving, at the first proxy node (e.g., ingress proxy node into the network), a packet that is to be sent through the network. In some instances, the packet may include an encrypted portion (e.g., layers 5-7, application layer, etc.) and an unencrypted portion (e.g., layers 1-4, network layer, etc.). For instance, the encrypted portion of the packet may include a Uniform Resource Locator (URL) associated with the first application, and the unencrypted portion of the packet may include a destination IP address associated with a frontend node of the container orchestration platform that is configured to forward traffic to the first application and the second application, as well as other applications hosted on the resources of the container orchestration platform. In some examples, the frontend node may be an L7 load balancer, a Kubernetes ingress node, an API gateway, or the like.

In some examples, upon receiving the packet, the first proxy node may decrypt the packet to analyze the data included in the encrypted portion of the packet. In this way, the first proxy node may determine that the packet is to be sent to the first application. For instance, the first proxy node may determine that the encrypted portion of the packet includes the URL associated with the first application, or other data that may be indicative that the packet is to be sent to the first application. In some examples, based at least in part on determining that the packet is to be sent to the first application, the first proxy node may alter one or more IP addresses included in the unencrypted portion of the packet in order to send the packet through the network via the first subflow. For instance, the first proxy node may replace the original, source IP address included in the unencrypted portion of the packet with the first proxy node's own local IP address assigned to the first subflow. Additionally, or in the alternative, the first proxy node may replace the original, destination IP address included in the unencrypted portion of the packet with the IP address of the second proxy node that is assigned to the subflow. In some examples, after modifying the packet, the first proxy node may re-encrypt the packet and/or send the packet through the network.

In some examples, the packet may be sent through the network form the first proxy node to the second proxy node (e.g., from the ingress edge of the network to the egress edge of the network). In some examples, upon receiving the packet, the second proxy node may decrypt the packet to analyze the data included in the encrypted portion of the packet. In this way, the second proxy node may determine that the packet is to be sent to the first application. For instance, the second proxy node may determine that the encrypted portion of the packet includes the URL associated with the first application, or the other data that may be indicative that the packet is to be sent to the first application. In some examples, based at least in part on determining that the packet is to be sent to the first application, the first proxy node may alter the one or more IP addresses included in the unencrypted portion of the packet in order to send the packet to the first application, since the IP addresses had been altered by the first proxy node to send the packet through the network via the first subflow. For instance, the second proxy node may replace the source IP address of the packet (e.g., corresponding with the first proxy node's own local IP address assigned to the first subflow) with the original source IP address of the device that sent the packet. Additionally, or in the alternative, the second proxy node may replace the destination IP address of the packet (e.g., corresponding with the IP address of the second proxy node that is assigned to the subflow) with the original destination IP address corresponding with the frontend node of the container orchestration platform. In some examples, after modifying the packet, the second proxy node may re-encrypt the packet and forward the packet to the frontend node. In various examples, return traffic from the application to the client may follow an analogous process. That is, optimizations may be bi-directional.

In some examples, a controller of the network may receive metadata associated with the applications hosted on the container orchestration platform in order to establish subflow policies. In some examples, the metadata may be indicative of a traffic class associated with the application's traffic. For instance, the metadata may indicate whether the traffic is video traffic, audio traffic, web traffic, or the like. In some examples, the controller may determine that an already established subflow is associated with a certain level of service that is suitable for the application's traffic and assign that application's traffic to be sent through that subflow.

According to the techniques described herein, several improvements in computer-related technology can be realized. For instance, data flows through L3 networks can be de-multiplexed so that the L3 network can see different flows for each L7 subflow. As such, the L3 network may no longer be looking at one flow that goes to a single place, but multiple, small flows that may go to different places. This allows for making per-flow optimizations at L3, such as low latency, best effort, high throughput, etc. That is, the techniques effectively enable the flows to be optimized as they go through the network at both L3 and L7, and still end up sending the right flow to the right back-end and/or front-end system. Additionally, the techniques described herein make it possible to load balance at L3 in a similar fashion to the load balancing that happens at L7 for L7 subflows. For instance, first flows for a first application and second flows for a second application could be load balanced in the L3 network similarly to how they are load balanced on the application infrastructure. Additionally, the L3 load balancing would be transparent to the applications and/or end users, while also improving the application experience. Other improvements in computer-related technology will be easily apparent to those having ordinary skill in the art.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 that may be used to implement various aspects of the technologies described herein. The architecture 100 includes one or more networks, such as the network 102 and the enterprise network 104. In some examples, the network 102 may be a software-defined wide area network (SD-WAN), a wide area network (WAN), another type of L3 network, or any other type of network.

In examples, the enterprise network 104 is an information technology (IT) infrastructure that organizations use to provide connectivity among users, client devices 106, and applications. The goal of the enterprise network 104 may be to support the organizations' objectives by consistently delivering connected digital services reliably and securely to workers, partners, customers, things, etc. In some examples, the enterprise network 104 may include separate but connected constituent domains. Typically, each constituent network of the enterprise network 104 may be designed, provisioned, and optimized for its own purpose and business objectives. Example constituent network types may include (a) campus networks, branch networks, and Internet of Things (IoT) networks (e.g., which may provide fixed and mobile access to users and things, may be present in all areas of an organization, both in offices and in operational spaces such as manufacturing and warehouse facilities, and may be optimized for transparent, secure access and high density), (b) data center and hybrid cloud networks (e.g., which may connect to and among applications, workloads, and data, within on-premises data centers and private and public cloud services, and may be optimized for low latency, security, and mission-critical reliability), (c) wide-area networks (WANs) (e.g., which may connect facilities, buildings, or campuses to other branches, to data centers, or to cloud resources, and may be optimized for user experience and bandwidth efficiency), or the like. The enterprise network 104 of FIG. 1 may be representative of any one of these example constituent network types, as well as other network types not explicitly listed.

In some examples, the proxy nodes 108(1) and 108(2) (hereinafter referred to collectively as "proxy nodes 108") may send traffic through the network 102 via the subflows 112. In some examples, the proxy nodes 108 may be HTTPS proxies, HTTP proxies, or the like. The proxy nodes 108(1) and 108(2) may be placed at the entry and exit points of the network 102 before and after the network edge nodes 110(1) and 110(2), respectively. In some examples, the proxy nodes 108 can either be co-located with the network edge nodes 110 or can be separate entities. In some examples, IP addresses may be overprovisioned in the proxy nodes 108 for each of the subflows 112 through the network 102. In some examples, because IP addresses may be more limited than the number of subflows 112, flows that are to be treated similarly may be grouped into a set and assigned the same IP address/subflow 112. In examples, each of the different subflows 112 may be associated with a different service level or characteristic. For instance, a first subflow 112 may be a best effort subflow, a second subflow 112 may be a low latency subflow, a third subflow 112 may be a high throughput subflow, and the like.

In some examples, the proxy nodes 108 may be configured with one or more attributes for identifying a subflow 112. For instance, the proxy nodes 108 may be configured with a URL that points to a particular microservice, an HTTP/HTTPS header that identifies a subflow 112 as destined to a given microservice, or the like. In some examples, the proxy nodes 108 may be configured with the IP address that has been assigned to identify the subflow 112 (or set of subflows), as well as the IP addresses that each remote proxy node 108 may be using to identify the same subflow 112 (or set of subflows).

In some examples, one or more of the extra IP addresses configured in the proxy nodes 108 may be assigned to each configured subflow 112 (or set of subflows). In this way, when the proxy nodes 108 have to send traffic for one of the subflows 112 (or set of subflows), the proxy nodes 108 may use the configured IP address rather than the regular IP address. For instance, if the proxy node 108(1) is sending traffic through the network 102, the proxy node 108(1) may use its local IP address assigned to the subflow 112 (or set of subflows) as the source IP address and the IP address configured on the remote proxy 108(2) for the subflow 112 (or set of subflows) as the destination IP address. In some examples, this arrangement may be flexible depending on implementation, and some implementations of the techniques may, for instance, simply use the destination IP address assigned to the subflow 112 (or set of subflows) while leaving the source IP address to be non-subflow specific.

In some examples, the client device(s) 106 may send and receive traffic through the network to and from an application running on a container orchestration platform 114. In some examples, the container orchestration platform 114 may be representative of a scalable application orchestration system, such as Kubernetes, Docker Swarm, Rancher, Azure Container Instance, or the like. The container orchestration platform 114 may host one or more applications 116(1)-116(N) (where N represents any number greater than or equal to one). In some examples, traffic that is being sent to one of the applications 116 of the container orchestration platform 114 may be first received at a frontend load balancer 118 (e.g., an L7 load balancer), forwarded to an ingress node 120 of the container orchestration platform 114, and then proxied to the applications 116 by one or more proxies 122(1)-122(N).

In some examples, the architecture 100 may also include a controller 124. The controller 124 may include a network controller component 126, a proxy management component 128, and an application connector component 130. In some examples, the network controller component 126 may manage one or more aspects and/or policies of the network 102. For instance, the network controller component 126 may establish different tunnels, paths, and/or priorities for the subflows 112 between the proxy nodes 108. In some examples, the proxy management component 128 may manage one or more aspects of the proxies 108. For instance, the proxy management component 128 may provision IP addresses on the proxy nodes 108 for assignment to the subflows 112. In some examples, the proxy management component 128 may abstract all details for the proxy nodes 108, to the point that the proxy nodes 108 might not even be aware that they are establishing "subflows" or being used to apply certain levels of service/policies. In other words, the proxy management component 128 can configure the proxy nodes 108 so that the proxies use a given IP address in the presence of a certain URL or HTTP headers, without realizing that IP address identifies a subflow that it is then used to apply a certain policy.

In some examples, the application connector component 130 may receive policy information associated with the applications 116 from the container orchestration platform 114 (e.g., via a control component in the application, the orchestrator itself, an ingress controller, a service mesh, etc.). The policy information may be indicative of which subflow 112 should be used to send which applications traffic through the network 102. For instance, for one application, the policy information may indicate that a low latency subflow 112 is to be used, while for another application, the policy information may indicate that a high throughput subflow 112 is to be used. In some examples, the application connector 130 may receive metadata associated with an application, indicating what type of application it is, and a subflow 112 may be selected or established based on the metadata. For instance, the metadata may indicate that an application is a video application, a streaming application, an audio application, a webpage, or the like, and the subflow 112 may be selected by the controller 124 (or one of its components) based on the application information.

Figure 2:
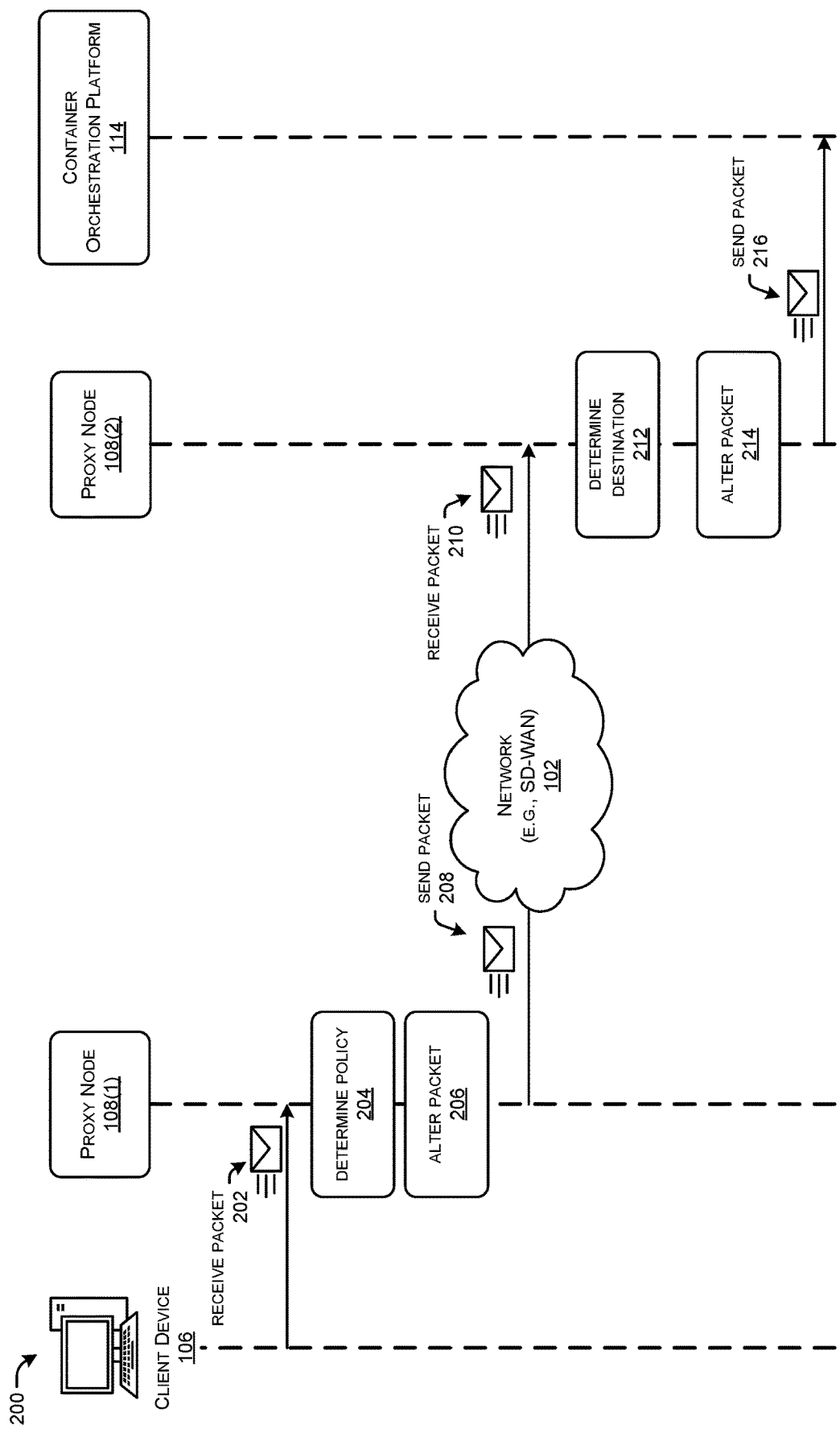
FIG. 2 is a data flow diagram illustrating example operations that may be performed devices of the architecture to demultiplex L7 flows into multiple subflows for L3 policy enforcement.

FIG. 2 is a data flow diagram illustrating an example process 200 that may be performed by devices of the architecture to demultiplex L7 flows into multiple subflows for L3 policy enforcement. At 202, the proxy node 108(1) receives a packet from the client device 106 that is to be sent through the network 102 to the container orchestration platform 114. In some instances, the packet may include an encrypted portion (e.g., layers 5-7, application layer, etc.) and an unencrypted portion (e.g., layers 1-4, network layer, etc.). For instance, the encrypted portion of the packet may include a Uniform Resource Locator (URL) associated with an application running on the container orchestration system 114, and the unencrypted portion of the packet may include a destination IP address associated with a frontend node of the container orchestration platform 114 that is configured to forward traffic to the applications running on the container orchestration platform 114.

At operation 204, the process 200 includes determining, by the proxy node 108(1), a networking policy associated with sending the packet through the network 102. In some examples, to determine the networking policy, the proxy node 108(1) may decrypt the packet to analyze the data included in the encrypted portion of the packet. In this way, the proxy node 108(1) may determine which application that the packet is to be sent to. For instance, the proxy node 108(1) may determine that a URL included in the encrypted portion of the packet corresponds with a specific application. In some examples, based at least in part on determining the application to which the packet is to be sent, the proxy node 108(1) may identify which subflow to use to send the packet through the network 102. For instance, the proxy node 108(1) may select the subflow based on a networking policy associated with the application (e.g., high throughput, low latency, etc.).

At operation 206, the proxy node 108(1) may alter the packet in order to send the packet through the network 102 via the selected subflow. For instance, the proxy node 108(1) may alter one or more IP addresses included in the unencrypted portion of the packet in order to send the packet through the network via the selected subflow. For instance, the proxy node 108(1) may replace the original, source IP address included in the unencrypted portion of the packet with the local IP address of the proxy node 108(1) that is assigned to the subflow. Additionally, or in the alternative, the proxy node 108(1) may replace the original, destination IP address included in the unencrypted portion of the packet with the IP address of the proxy node 108(2) that is assigned to the subflow. In some examples, after modifying the packet, the proxy node 108(1) may re-encrypt the packet. At operation 208, the proxy node 108(1) sends the packet through the network 102 via the selected subflow.

At operation 210, the proxy node 108(2) receives the packet from the proxy node 108(1). At operation 212, the proxy node 108(2) determines a destination of the packet. In some examples, the proxy node 108(2) may decrypt the packet to analyze the data included in the encrypted portion of the packet. In this way, the proxy node 108(2) may determine that the packet is to be sent to the application running on the container orchestration platform 114. For instance, the proxy node 108(2) may determine that the encrypted portion of the packet includes the URL associated with the application, or other data that may be indicative that the packet is to be sent to the application.

At operation 214, the proxy node 108(2) may alter the packet before sending it to the container orchestration platform 114. For instance, based at least in part on determining that the packet is to be sent to the application, the proxy node 108(2) may alter the one or more IP addresses included in the unencrypted portion of the packet in order to send the packet to the application, since the IP addresses had been altered by the proxy node 108(1) to send the packet through the network 102 via the selected subflow. In some examples, the proxy node 108(2) may replace the source IP address of the packet (e.g., corresponding with the proxy node's 108(1) own local IP address assigned to the subflow) with the original source IP address of the client device 106 that sent the packet. Additionally, or in the alternative, the proxy node 108(2) may replace the destination IP address of the packet (e.g., corresponding with the IP address of the proxy node 108(2) that is assigned to the subflow) with the original destination IP address corresponding with the frontend node of the container orchestration platform 114. At operation 216, after modifying the packet, the proxy node 108(2) may send the packet to the container orchestration platform 114. In some examples, the proxy node 108(2) may re-encrypt the packet before sending it to the container orchestration platform 114.

Figure 3:
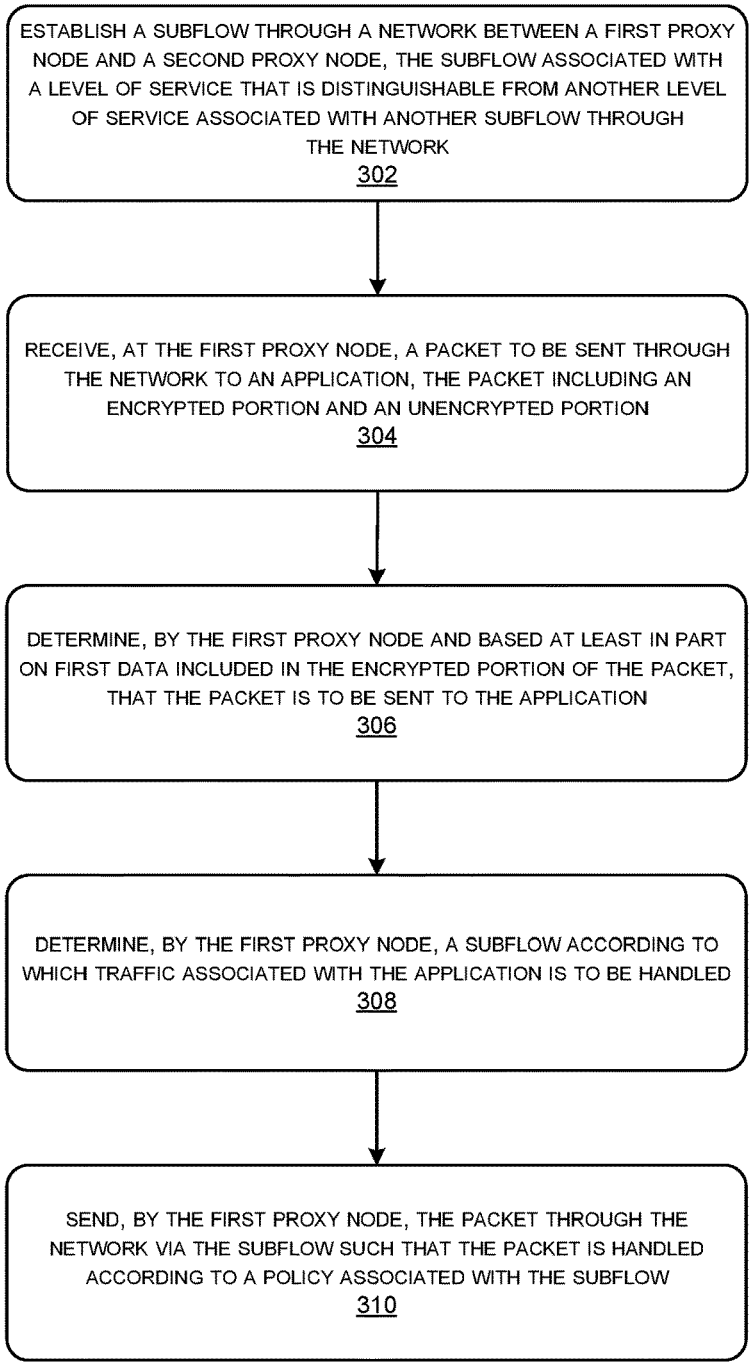
FIG. 3 is a flow diagram illustrating an example method associated with demultiplexing L7 flows into multiple subflows for L3 policy enforcement.
Figure 4:
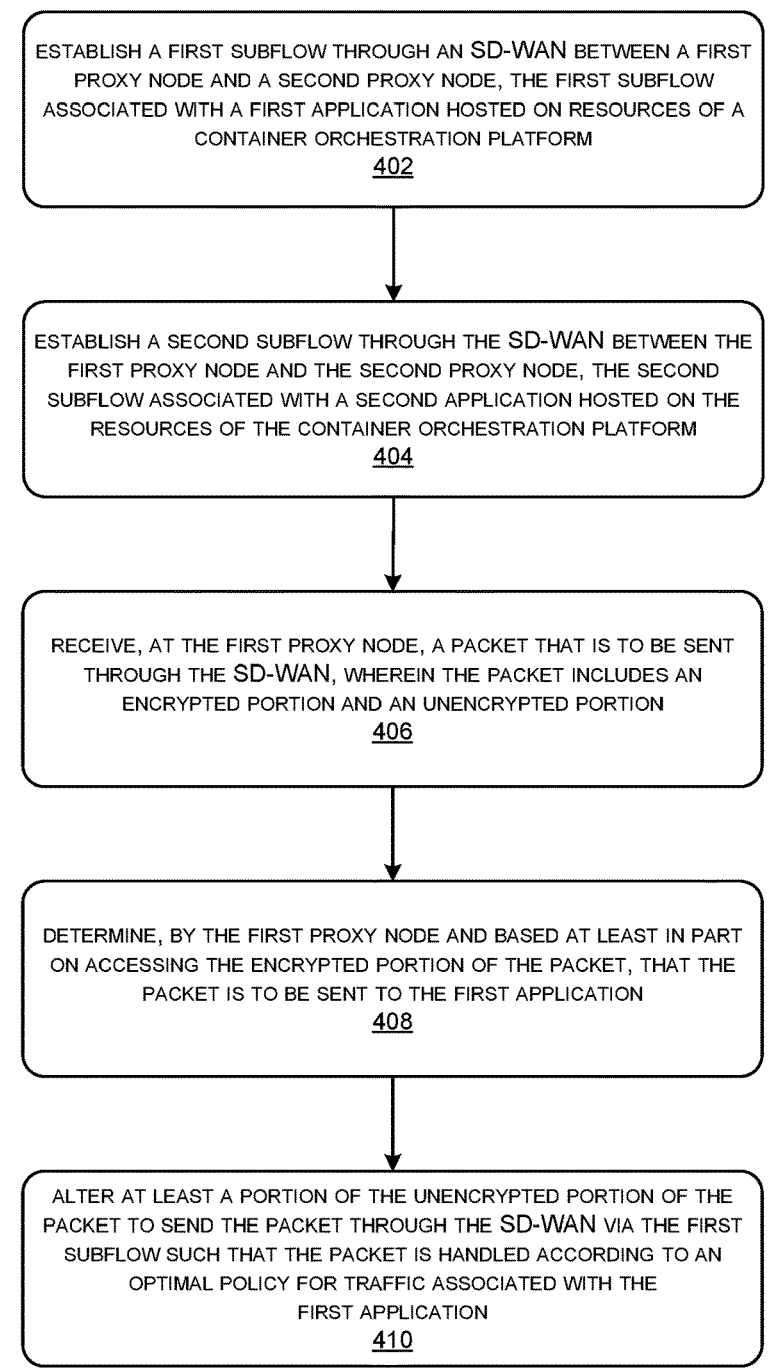
FIG. 4 is a flow diagram illustrating another example method associated with demultiplexing L7 flows into multiple subflows for L3 policy enforcement.

FIGS. 3 and 4 are flow diagrams illustrating example methods 300 and 400 according to the techniques described herein. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 3 and 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 is a flow diagram illustrating an example method 300 associated with demultiplexing L7 flows into multiple subflows for L3 policy enforcement. The method 300 begins at operation 302, which includes establish a subflow through a network between a first proxy node and a second proxy node, the subflow associated with a policy (e.g., level of service) that is distinguishable from another policy associated with another subflow through the network. For instance, the subflow 112 may be established through the network 102 between the proxy nodes 108.

At operation 304, the method 300 includes receiving, at the first proxy node, a packet that is to be sent through the network to an application, the packet including an encrypted portion and an unencrypted portion. For instance, the proxy node 108(1) may receive the packet from the client device 106. The packet may need to be sent through the network 102 to one of the applications 116 running on the container orchestration platform 114.

At operation 306, the method 300 includes determining, by the first proxy node and based at least in part on first data included in the encrypted portion of the packet, that the packet is to be sent to the application. For instance, the proxy node 108(1) may determine that the packet is to be sent to the application 116 based at least in part on first data included in the encrypted portion of the packet. That is, the proxy node 108(1) may access data included in an application layer of the packet to determine which application 116 the packet is destined for.

At operation 308, the method 300 includes determining, by the first proxy node, a subflow according to which traffic associated with the application is to be handled. For instance, the proxy node 108(1) may determine the subflow according to which traffic associated with the application 116 is to be handled. In some examples, the subflow may be associated with a certain policy, such as a high throughput, a low latency, a best effort, a high bandwidth, a certain level of security, a geo-fence, or the like. In some examples, the level of service may be based on a type or classification of the traffic, such as whether the traffic is voice traffic, video traffic, streaming traffic, web traffic, audio traffic, etc.

At operation 310, the method 300 includes sending, by the first proxy node, the packet through the network via the subflow such that the packet is handled according to the policy. For instance, the proxy node 108(1) may send the packet through the network 102 via the subflow 112 in order to maintain the level of service. In examples, the packet is sent from the proxy node 108(1) to the proxy node 108(2) via the subflow.

FIG. 4 is a flow diagram illustrating another example method 400 associated with demultiplexing L7 flows into multiple subflows for L3 policy enforcement. The method 400 begins at operation 402, which includes establishing a first subflow through an SD-WAN between a first proxy node and a second proxy node, the first subflow associated with a first application hosted on resources of a container orchestration platform. For instance, the first subflow 112 may be established through the network 102, which may be an SD-WAN, between the proxy node 108(1) and the proxy node 108(2). Additionally, the first subflow 112 may be associated with a first application 116(1) hosted on the container orchestration platform 114. That is, the first subflow may be associated with a first level of service that is preferable for the traffic associated with the first application.

At operation 404, the method 400 includes establishing a second subflow through the SD-WAN between the first proxy node and the second proxy node, the second subflow associated with a second application hosted on the resources of the container orchestration platform. For instance, the second subflow 112 may be established through the network 102, which may be an SD-WAN, between the proxy node 108(1) and the proxy node 108(2). Additionally, the second subflow 112 may be associated with a second application 116(2) hosted on the container orchestration platform 114. That is, the second subflow may be associated with a second level of service that is different from the first level of service and that is preferable for the traffic associated with the second application. For instance, the first level of service of the first subflow may be associated with high throughput, while the second level of service of the second subflow may be associated with low latency.

At operation 406, the method 400 includes receiving, at the first proxy node, a packet that is to be sent through the SD-WAN, wherein the packet includes an encrypted portion and an unencrypted portion. For instance, the proxy node 108(1) may receive the packet that is to be sent through the network 102, which may be an SD-WAN, and the packet may include an encrypted portion and an unencrypted portion. For instance, the application layer of the packet may be encrypted, and the network layer of the packet may be unencrypted.

At operation 408, the method 400 includes determining, by the first proxy node and based at least in part on accessing the encrypted portion of the packet, that the packet is to be sent to the first application. For instance, the proxy node 108(1) may determine that the packet is to be sent to the first application 116(1) based at least in part on a URL or other data included in the encrypted portion of the packet. As an example, the first proxy node may access an application layer of the packet to obtain information associated with the application to which the packet is to be sent.

At operation 410, the method 400 includes altering at least a portion of the unencrypted portion of the packet to send the packet through the SD-WAN via the first subflow such that the packet is handled according to an optimal policy for traffic associated with the first application. For instance, an IP address included in the unencrypted portion of the packet may be altered to send the packet through the SD-WAN via the first subflow. As described herein, each subflow may be associated with a specific IP address assigned to the proxy node(s), and by altering the packet to include the subflow specific IP address as the destination address, the packet may be sent via the specific subflow.

Figure 5:
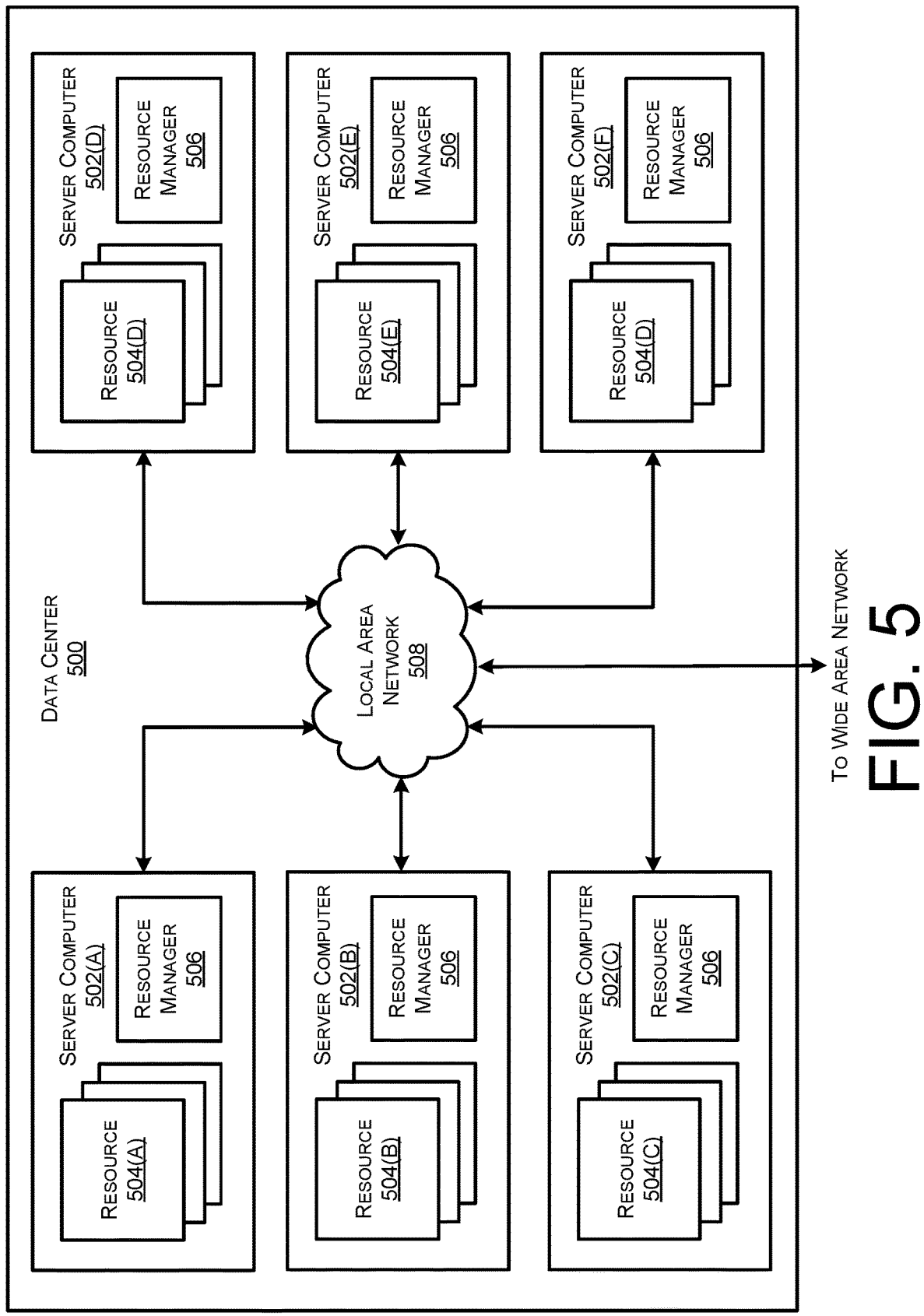
FIG. 5 is a computing system diagram illustrating an example configuration of a data center that can be utilized to implement aspects of the technologies disclosed herein.

FIG. 5 is a computing system diagram illustrating an example configuration of a data center 500 that can be utilized to implement aspects of the technologies disclosed herein. The example data center 500 shown in FIG. 5 includes several server computers 502A-502F (which might be referred to herein singularly as "a server computer 502" or in the plural as "the server computers 502") for providing computing resources. In some examples, the resources and/or server computers 502 may include, or correspond to, any type of networked devices or nodes described herein. Although described as servers, the server computers 502 may comprise any type of networked device, such as servers, switches, routers, hubs, bridges, gateways, modems, repeaters, access points, etc. In some examples, the example data center 500 may correspond with the network 102, the enterprise network 104, or the container orchestration platform 114 described herein.

The server computers 502 can be standard tower, rack-mount, or blade server computers configured appropriately for providing computing resources. In some examples, the server computers 502 may provide computing resources 504 including data processing resources such as VM instances or hardware computing systems, database clusters, computing clusters, storage clusters, data storage resources, database resources, networking resources, security, packet inspection, and others. Some of the servers 502 can also be configured to execute a resource manager 506 capable of instantiating and/or managing the computing resources. In the case of VM instances, for example, the resource manager 506 can be a hypervisor or another type of program configured to enable the execution of multiple VM instances on a single server computer 502. Server computers 502 in the data center 500 can also be configured to provide network services and other types of services.

In the example data center 500 shown in FIG. 5, an appropriate local area network (LAN) 508 is also utilized to interconnect the server computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the server computers 502A-502F in each data center 500, and, potentially, between computing resources in each of the server computers 502. It should be appreciated that the configuration of the data center 500 described with reference to FIG. 5 is merely illustrative and that other implementations can be utilized.

In some examples, the server computers 502 may each execute one or more application containers and/or virtual machines to perform techniques described herein. In some instances, the data center 500 may provide computing resources, like application containers, VM instances, and storage, on a permanent or an as-needed basis. Among other types of functionality, the computing resources provided by a cloud computing network may be utilized to implement the various services and techniques described above. The computing resources 504 provided by the cloud computing network can include various types of computing resources, such as data processing resources like application containers and VM instances, data storage resources, networking resources, data communication resources, network services, and the like. The computing resources 504 may be utilized to run instances of secure access nodes or other workloads.

Each type of computing resource 504 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, secure access points, some or all of the network services described above, and/or other types of programs. Data storage resources can include file storage devices, block storage devices, and the like. The cloud computing network can also be configured to provide other types of computing resources 504 not mentioned specifically herein.

The computing resources 504 provided by a cloud computing network may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 6.

Figure 6:
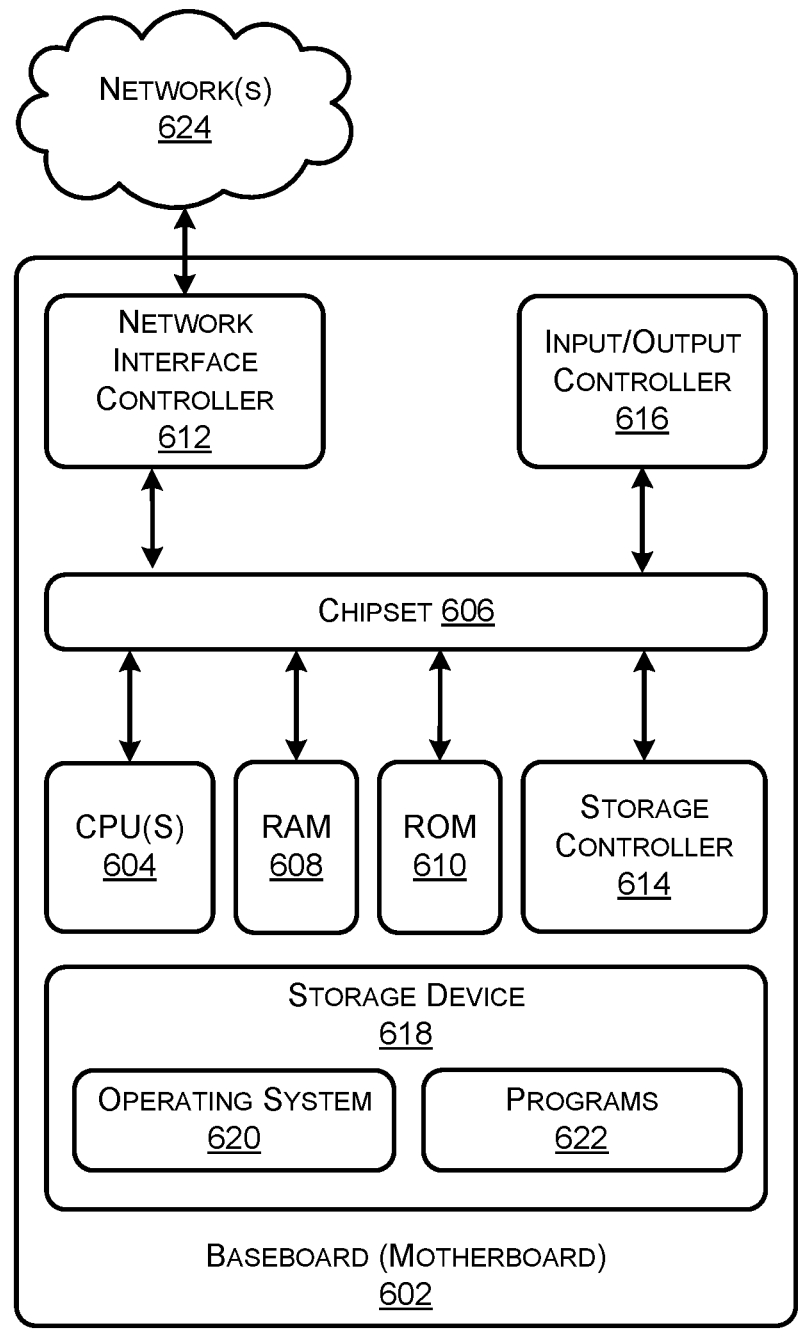
FIG. 6 is a computer architecture diagram showing an illustrative computer hardware architecture for implementing a computing device that can be utilized to implement aspects of the various technologies presented herein.

FIG. 6 is a computer architecture diagram showing an illustrative computer hardware architecture for implementing a computing device that can be utilized to implement aspects of the various technologies presented herein. The computer architecture shown in FIG. 6 illustrates a conventional server computer, network node (e.g., secure access node), router, workstation, desktop computer, laptop, tablet, network appliance, e-reader, smartphone, load balancer, or other computing device, and can be utilized to execute any of the software components presented herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 102, the enterprise network 104, the container orchestration platform 114, or the like. The chipset 606 can include functionality for providing network connectivity through a NIC 612, such as a gigabit Ethernet adapter. The NIC 612 is capable of connecting the computer 600 to other computing devices over the network 624. It should be appreciated that multiple NICs 612 can be present in the computer 600, connecting the computer to other types of networks and remote computer systems. In some examples, the NIC 612 may be configured to perform at least some of the techniques described herein.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the architecture 100 and or any components included therein, may be supported by one or more devices similar to computer 600. Stated otherwise, some or all of the operations performed by the architecture 100, and or any components included therein, may be performed by one or more computer devices 600 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes and functionality described above with regard to FIGS. 1-5, and herein. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

The computer 600 may include one or more hardware processors (processors) configured to execute one or more stored instructions. The processor(s) may comprise one or more cores. Further, the computer 600 may include one or more network interfaces configured to provide communications between the computer 600 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for demultiplexing L7 flows into multiple subflows for L3 policy enforcement without having to modify the underlying L3 network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
establishing a subflow through a network between a first proxy node and a second proxy node, the subflow associated with a policy that is distinguishable from another policy associated with another subflow through the network;
receiving, at the first proxy node, a packet to be sent through the network, the packet including:
an encrypted portion including first data indicating that the packet is to be sent to an application; and
an unencrypted portion including at least a destination internet protocol (IP) address field, the destination IP address field including a first IP address corresponding with a frontend node that is configured to forward traffic to the application and to other applications;
associating, with the subflow, a second IP address corresponding with the second proxy node, the second IP address being distinguishable from another IP address that (i) corresponds with the second proxy node and that (ii) is associated with the other subflow;

altering the destination IP address field of the unencrypted portion of the packet to include the second IP address instead of the first IP address;

determining, by the first proxy node and based at least in part on the encrypted portion, that the packet is to be sent to the application; and based at least in part on determining that the packet is to be sent to the application, sending the packet through the network via the subflow such that the packet is handled according to the policy.

2. The method of claim 1, wherein the policy associated with the subflow comprises one or more of an amount of throughput associated with the subflow, a packet loss frequency associated with the subflow, a bit error frequency associated with the subflow, or an amount of latency associated with the subflow.

3. The method of claim 1, wherein determining that the packet is to be sent to the application comprises:

decrypting, by the first proxy node, the encrypted portion of the packet; and determining, by the first proxy node and based at least in part on the first data included in the encrypted portion, that the packet is to be sent to the application.

4. The method of claim 3, wherein:

the first data includes at least a Uniform Resource Locator (URL) that is associated with the application, and determining that the packet is to be sent to the application is further based at least in part on the URL.

5. The method of claim 1, further comprising:

receiving metadata associated with the application, the metadata indicative of a type of the application to which the traffic is being sent;

determining that the policy associated with the subflow is suitable for the type of the application; and wherein sending the packet through the network via the subflow is further based at least in part on determining that the policy is suitable for the traffic.

6. The method of claim 1, wherein the network is a Software-defined Wide Area Network (SD-WAN) and the application is hosted on resources of a scalable container orchestration platform.

7. The method of claim 1, wherein the encrypted portion of the packet is an application layer of the packet and the unencrypted portion of the packet is a network layer of the packet.

8. A system comprising:

one or more processors; and one or more non-transitory computer-readable media storing instructions that, when executed, cause the one or more processors to perform operations comprising:

establishing a subflow through a network between a first proxy node and a second proxy node, the subflow associated with a policy that is distinguishable from another policy associated with another subflow through the network;

receiving, at the first proxy node, a packet to be sent through the network, the packet including:

an encrypted portion including first data indicating that the packet is to be sent to an application; and an unencrypted portion including at least a destination internet protocol (IP) address field, the destination IP address field including a first IP address corresponding with a frontend node that is configured to forward traffic to the application and to other applications;

associating, with the subflow, a second IP address corresponding with the second proxy node, the second IP address being distinguishable from another IP address that (i) corresponds with the second proxy node and that (ii) is associated with the other subflow;

altering the destination IP address field of the unencrypted portion of the packet to include the second IP address instead of the first IP address; and determining, at the first proxy node and based at least in part on the encrypted portion, that the packet is to be sent to the application; and based at least in part on determining that the packet is to be sent to the application, sending the packet through the network via the subflow such that the packet is handled according to the policy.

9. The system of claim 8, wherein the policy associated with the subflow comprises one or more of an amount of throughput associated with the subflow, a packet loss frequency associated with the subflow, a bit error frequency associated with the subflow, or an amount of latency associated with the subflow.

10. The system of claim 8, wherein determining that the packet is to be sent to the application comprises:

decrypting, at the first proxy node, the encrypted portion of the packet; and determining, at the first proxy node and based at least in part on the first data included in the encrypted portion, that the packet is to be sent to the application.

11. The system of claim 8, wherein:

the first data includes at least a Uniform Resource Locator (URL) that is associated with the application, and determining that the packet is to be sent to the application is further based at least in part on the URL.

12. The system of claim 8, further comprising:

receiving metadata associated with the application, the metadata indicative of an application type associated with the application;

determining that the policy associated with the subflow is suitable for the application type; and wherein sending the packet through the network via the subflow is further based at least in part on determining that the policy is suitable for the application type.

13. The system of claim 8, wherein the network is a Software-defined Wide Area Network (SD-WAN) and the application is hosted on resources of a scalable container orchestration platform.

14. The system of claim 8, wherein the encrypted portion of the packet is associated with an application layer of the packet and the unencrypted portion of the packet is associated with a network layer of the packet.

15. A method comprising:

establishing a first subflow through a Software-defined Wide Area Network (SD-WAN) between a first proxy node and a second proxy node, the first subflow associated with a first application hosted on resources of a container orchestration platform;

establishing a second subflow through the SD-WAN between the first proxy node and the second proxy node, the second subflow associated with a second application hosted on the resources of the container orchestration platform;

receiving, at the first proxy node, a packet to be sent through the SD-WAN, wherein:

an encrypted portion of the packet includes a Uniform Resource Locator (URL) associated with the first application, and an unencrypted portion of the packet includes a destination internet protocol (IP) address associated with a frontend node of the container orchestration platform, the frontend node configured to forward traffic to the first application and the second application;

altering, by the first proxy node, the unencrypted portion of the packet such that the destination IP address corresponds with the second proxy node and a source IP address of the packet corresponds with the first proxy node; and determining, at the first proxy node and based at least in part on accessing the encrypted portion of the packet, that the packet is to be sent to the first application; and based at least in part on determining that the packet is to be sent to the first application, sending the packet through the SD-WAN via the first subflow such that the packet is handled according to an optimal level of service for traffic associated with the first application.

16. The method of claim 15, wherein the first subflow is configured to provide the optimal level of service for traffic associated with the first application and the second subflow is configured to provide another level of service for traffic associated with the second application.

17. The method of claim 16, wherein the level of service associated with the first subflow comprises one or more of an amount of throughput associated with the first subflow, a packet loss frequency associated with the first subflow, a bit error frequency associated with the first subflow, or an amount of latency associated with the first subflow.

18. The method of claim 15, further comprising:
associating, a first set of IP addresses with the first subflow for sending traffic to the first application, the first set of IP addresses including a first IP address corresponding with the first proxy node and a second IP address corresponding with the second proxy node; and associating, a second set of IP addresses with the second subflow for sending traffic to the second application, the second set of IP addresses including a third IP address corresponding with the first proxy node and a fourth IP address corresponding with the second proxy node.

19. The method of claim 15, wherein determining that the packet is to be sent to the application comprises:
decrypting, by the first proxy node, the encrypted portion of the packet; and determining, by the first proxy node and based at least in part on the URL included in the encrypted portion, that the packet is to be sent to the application.

20. The method of claim 15, further comprising:
receiving metadata associated with the application, the metadata indicative of a type of the application to which the traffic is being sent;

determining that the policy associated with the subflow is suitable for the type of the application; and wherein sending the packet through the network via the subflow is further based at least in part on determining that the policy is suitable for the traffic.

* * * * *